US00RE36142E

United States Patent [19]

Steed et al.

[11] E Patent Number: Re. 36,142

[45] Reissued Date of Patent: Mar. 16, 1999

[54] METHOD OF PACKAGING RESILIENTLY COMPRESSIBLE ARTICLES

[75] Inventors: C. Edward Steed, Alpharetta; Ricky F. Gladney, Fairburn, both of Ga.

[73] Assignee: Simmons Company, Atlanta, Ga.

[21] Appl. No.: 919,655

[22] Filed: Aug. 28, 1997

Related U.S. Patent Documents

Reissue of:

[64] Patent No.: 5,622,030
Issued: Apr. 22, 1997
Appl. No.: 694,803
Filed: Aug. 9, 1996

U.S. Applications:

[63] Continuation of Ser. No. 416,065, Apr. 4, 1995, abandoned.

[51] Int. Cl.[6] ..... B65B 1/24

[52] U.S. Cl. ..... 53/436; 53/524; 53/528; 53/114

[58] Field of Search ..... 53/432, 436, 469, 53/399, 114, 524, 528

[56] References Cited

U.S. PATENT DOCUMENTS

| | | | |
|---|---|---|---|
| 1,861,429 | 5/1932 | Schneider et al. | 53/114 |
| 3,585,700 | 6/1971 | Jansson | 53/436 |
| 3,611,524 | 10/1971 | Broyles | 53/432 |
| 4,234,983 | 11/1980 | Stumpf . | |
| 4,575,990 | 3/1986 | von Bismarck | 53/469 |
| 4,854,023 | 8/1989 | Stumpf | 53/114 |

*Primary Examiner*—James F. Coan
*Assistant Examiner*—Gene L. Kim
*Attorney, Agent, or Firm*—Jones, Day, Reavis & Pogue

[57] ABSTRACT

A method of packaging a resiliently compressible article comprises the steps of inserting the article into a tube of deformable material such that excess material is provided at the ends of the tube. A first end of the tube is then sealed closed. Air is then evacuated from the tube through the second end thereby deforming the tube around the article and causing the article to compress. While a vacuum is maintained in the tube, the second end of the tube is sealed closed. A containment sleeve is fitted over the sealed tube to maintain the article in a compressed state. When the article is unpackaged, the containment sleeve is severed and the tube is allowed to expand in a gradual controlled fashion by the bleeding of air back into the tube.

9 Claims, 3 Drawing Sheets

METHOD OF PACKAGING RESILIENTLY COMPRESSIBLE ARTICLES

Matter enclosed in heavy brackets [ ] appears in the original patent but forms no part of this reissue specification; matter printed in italics indicates the additions made by reissue.

This application is a *reissue application of Ser. No. 08/694,803 filed on Aug. 9, 1996 now U.S. Pat. No. 5,622, 030 which is a* continuation of application Ser. No. 08/416, 065 filed on Apr. 4, 1995 abandoned.

BACKGROUND OF THE INVENTION

1. Field of the Invention

The present invention relates generally to a method of packaging resiliently compressible articles and, more particularly, to a method wherein compressible articles can be conveniently packaged for shipment in a compressed state and can be unpackaged at their destination in a controlled manner.

2. Description of the Prior Art

Many articles of manufacture are lightweight and bulky and cannot be delivered to the consumer without an undesirably high cost associated with shipment. Often these articles are also inexpensive to manufacture but their cost to the consumer necessarily reflects a disproportionately high component of shipping charges, thereby adversely affecting the perceived value of the article to the consumer. One such article whose cost of shipment is undesirably high as compared to its manufactured cost is an innerspring component of a typical mattress, cushion or the like.

In standard mattress construction, for example, an innerspring assembly is used comprising an arrangement of closely packed coil springs. One form of innerspring construction which has proved to be highly successful is known as the Marshall construction. In this construction, individual coil springs are encapsulated in discrete pockets of fabric material with the pockets of fabric material formed together to create strings of coils. These strings of coils are then arranged in an array with the coil springs all oriented parallel to one another, thereby forming an innerspring assembly. An example of such construction is disclosed in U.S. Pat. No. 4,234,983, issued to Stumpf and assigned to the common assignee herein, the disclosure of which is expressly incorporated hereby by reference.

In order to construct a mattress assembly which provides adequate support yet is comfortable to the user, the springs used in the foregoing construction characteristically have such few coil turns and have such relatively weak compressive strength that they can be readily compressed to a size on the order of one-tenth their naturally expanded size. Accordingly, strings of coils of the foregoing type are lightweight and considerably bulky.

Recently, a new construction of mattress has been developed which is capable of being disassembled to knocked down form for convenient shipment to customers or retail outlets. Such a knock down mattress is disclosed in co-pending U.S. patent application Ser. No. 08/398,227 filed Mar. 3, 1995, assigned to the common assignee herein. This construction comprises four bolsters each having a generally rectangular cross section and dimensioned to be arranged in a mattress outline. The bolsters are retained within a shell having a bottom panel, perimeter side panels and a zippered cover panel. Each bolster comprises a fabric casing which contains lengths of pocketed spring coils.

The aforesaid mattress assembly, because of its knock down construction, can be shipped in a highly economical manner by comparison to conventional unitary mattress structures. The components of this mattress can be assembled into packages of very manageable size for shipment. However, it is desirable to provide a packaging method which further reduces the size of the packaging. To this end, vacuum packaging of the coil springs may be employed wherein the strings of coils are compressed within an initially evacuated plastic tube and retained in a compressed state by a containment sleeve fitted over the tube as the vacuum source is removed.

Because conventional springs of the pocketed coil type can be compressed significantly from their naturally extended state, substantial reductions in size of packaging for such springs can be achieved by vacuum packaging methods. However, a disadvantage of using known vacuum packaging methods to provide a compressed package of springs is that once the vacuum source is removed from the inner tube, the springs are entirely dependent upon the presence of the outer containment sleeve for retaining their compressed condition. Thus, once the containment sleeve is severed, such as in opening of the package, the springs can expand to their fully extended state in an uncontrolled and somewhat abrupt manner. The result is that opening of the spring package by severing the containment sleeve with a sharp instrument, for example, can be a surprising and possibly dangerous experience. Accordingly, it is desirable to provide a vacuum packaging method for packaging springs in a manner which permits controlled expansion of the springs upon opening of the package.

SUMMARY OF THE INVENTION

The present invention improves over the prior art by providing a method of packaging a resiliently compressible article comprising the steps of inserting the article into a tube of deformable material such that excess material is provided at the ends of the tube. A first end of the tube is then sealed closed. Air is then evacuated from the tube through the second end thereby deforming the tube around the article and causing the article to compress. While a vacuum is maintained in the tube, the second end of the tube is sealed closed. A containment sleeve is fitted over the sealed tube to maintain the article in a compressed state. When the article is unpackaged, the containment sleeve is severed and the tube is allowed to expand in a gradual, controlled fashion by the bleeding of air back into the tube.

BRIEF DESCRIPTION OF THE DRAWINGS

The foregoing and other novel features of the invention will become apparent upon a reading of the following detailed description taken in conjunction with the accompanying drawings wherein.

DETAILED DESCRIPTION OF THE PREFERRED EMBODIMENT

Figure 1:
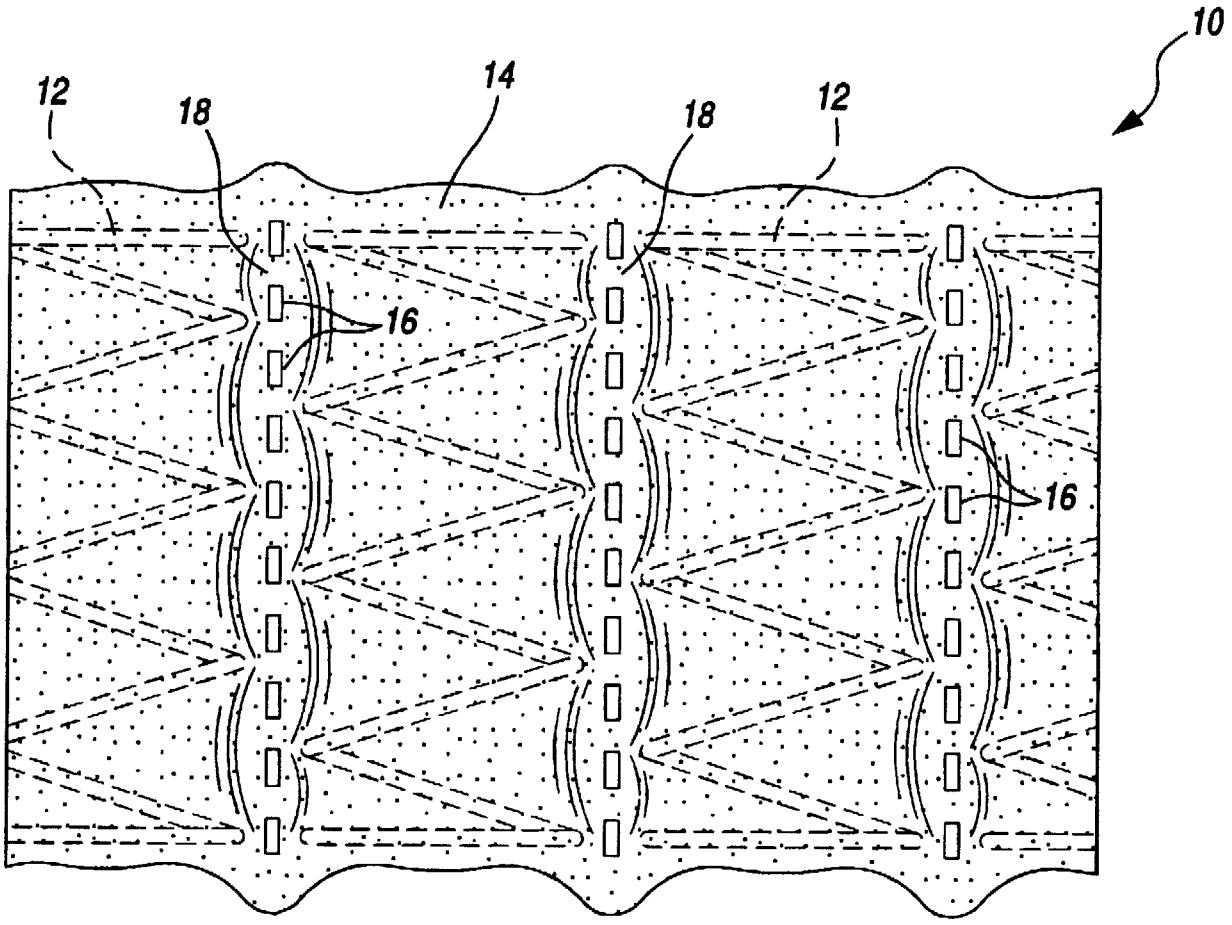
FIG. 1 is a fragmentary side elevational view of a string of pocketed coil springs as known in the prior art.

Referring now to the drawings, and initially to FIG. 1, a string of coil springs, as known in the art for use in innerspring construction of mattresses or the like is designated generally by the reference numeral 10. The coil string 10 includes individual coil springs 12 which are encapsulated in discrete pockets of suitable fabric 14. The fabric 14 is preferably heat sensitive such that ultrasonically formed welds 16 create webs 18 between adjacent coils 12 thereby defining the pockets. It can be appreciated that in this construction of a mattress innerspring or the like, the coil springs 12 are typically formed of relatively few coil turns and relatively weak compressive strength. Accordingly, these springs 12 can readily be compressed to a size which is only a fraction of their naturally expanded size.

Figure 2:
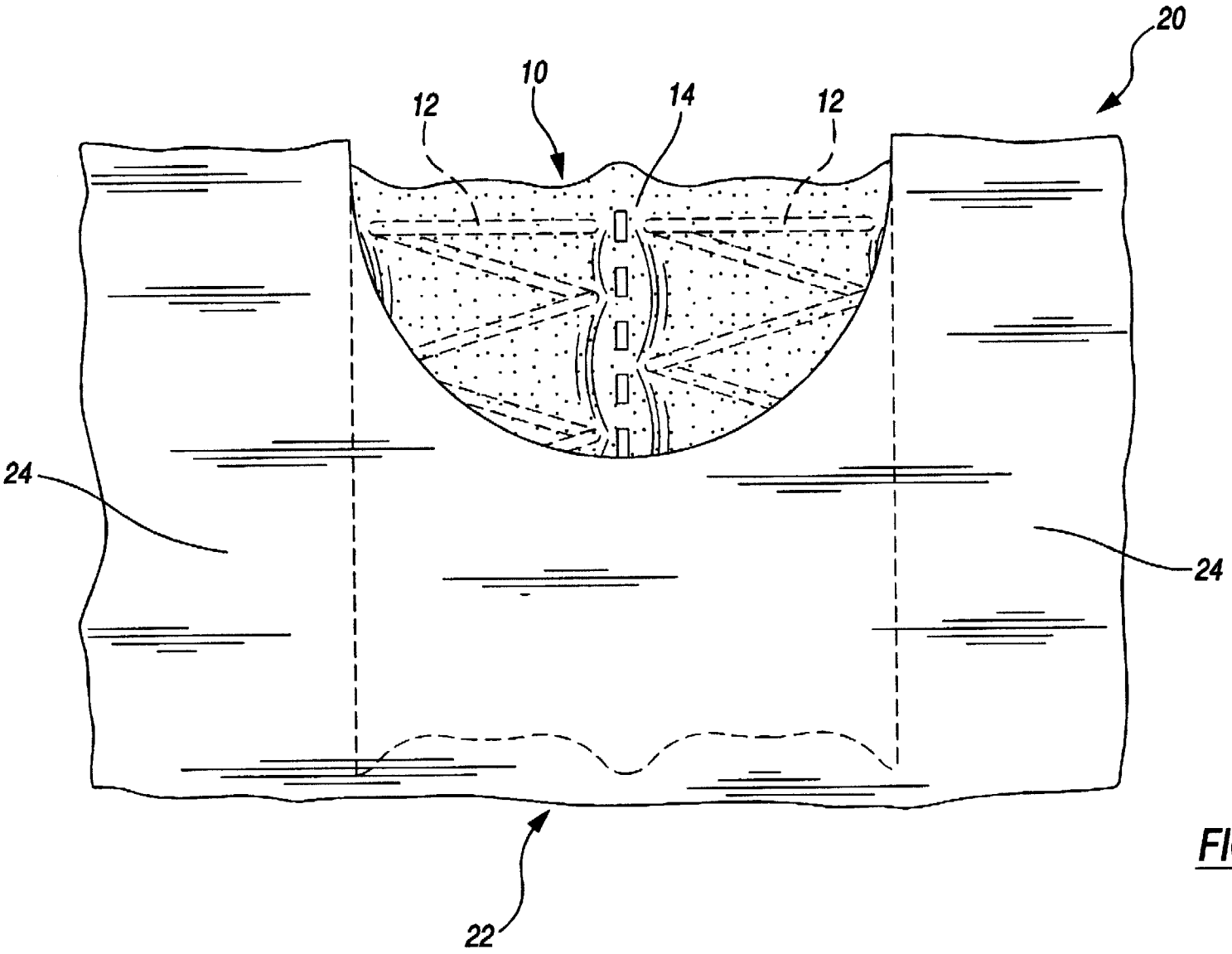
FIG. 2 is a side elevational view partly broken away showing a packaging system in accordance with the invention prior to evacuation.

Turning now to FIG. 2, a package system in accordance with the invention is designated generally by the reference numeral 20. The system 20 is shown as packaging a string of coil springs 10 of the type illustrated in FIG. 1, comprising coil springs 12 which are pocketed in fabric 14. The string 10 is inserted into a tube of deformable material 22. In preferred form, this material 22 is ¾ mil polyethylene which has been extruded into tubular form and is supplied in roll form. The tube 22 has a length greater than the length of the coil string 10 such that the two ends of the tube 22 define portions 24 of excess tube material 22.

Figure 3:
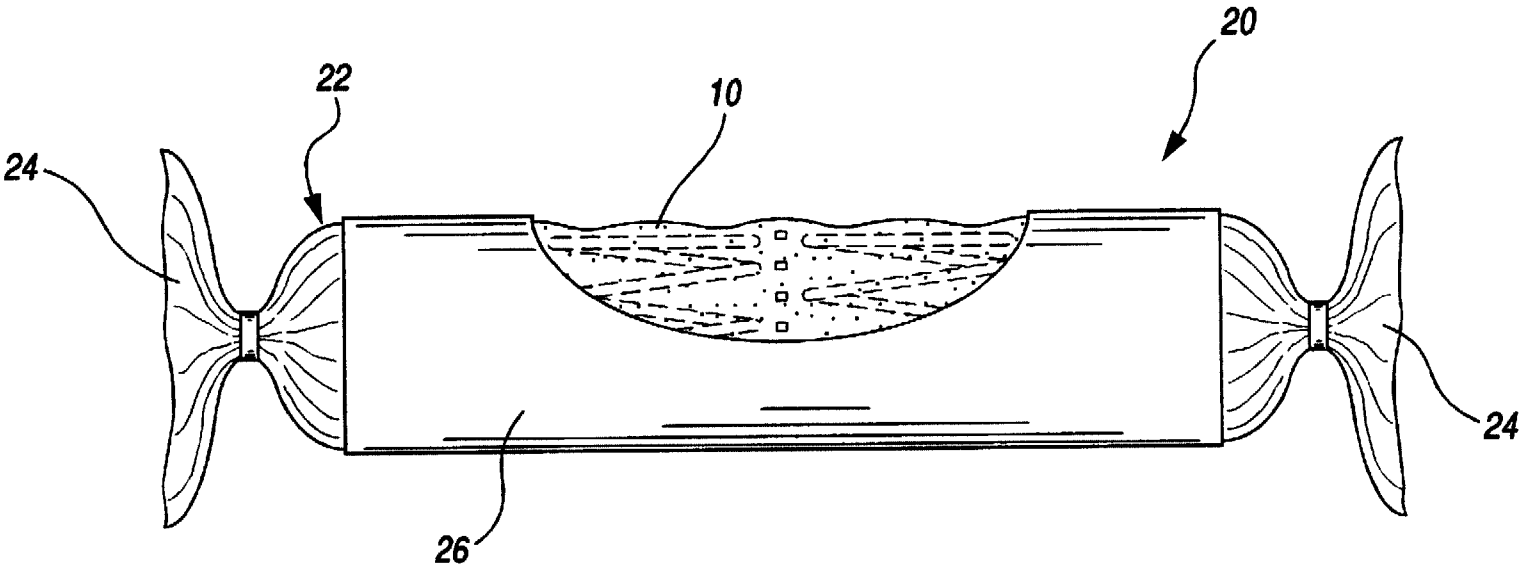
FIG. 3 is a side elevational view partly broken away showing the packaging system after evacuation.

Illustrated in FIG. 3 is the package system 20 shown in completed form, wherein the coil string 10 has been compressed and is maintained in a compressed state by a containment sleeve 26. Preferably, the containment sleeve 26 is an extruded tube of 4 mil polyethylene. In order to achieve the configuration of FIG. 3, one end 24 of the tube 22 is gathered and sealed. Sealing can be accomplished by various means including taking the gathered end 24, taping it closed, pinching the end 24 with a suitable clip or cable tie, or heat sealing the end 24. Then, the open end is manually gathered around a hose connected to a vacuum pump and the air within the tube 22 is evacuated. Evacuation of the tube 22 causes the tube to deform around the string of coils 10 and in turn causes the coils 10 to compress. When evacuation has reached a predetermined level, the containment sleeve 26 is installed over the compressed tube 22 and the second end 24 of the tube [is] *may be* sealed. The vacuum source is then removed.

It can now be appreciated that the packaging method in accordance with the invention provides a highly desirable method for packaging articles which are resiliently compressible. Although the invention has been described in connection with the packaging of coil string 10, it can be appreciated that numerous other compressible articles can be packaged with the present method for cost-effective shipment. The advantages of sealing the tube 22 at both ends 24 after evacuation should likewise be apparent. When the package 20 is delivered, the customer can sever the containment sleeve 26 and initially the tube 22 together with the article encapsulated therein will remain relatively compressed under the effect of the vacuum within the tube 22. Then, depending upon the type of end 24 sealing method used, air will gradually bleed into the tube 22 allowing the compressed article to slowly expand until the inside of the tube 22 reaches ambient air pressure. Accordingly, an undesirable, abrupt expansion of the tube 22 is avoided. If a sealing method is used which is too air tight, the tube 22 can simply be punctured with a small hole to allow air to enter the evacuated tube 22. By this method of packaging, strings 10 of pocketed coil springs 12 stacked 23 inches high can readily be compressed to a stack 5 inches high and, thereby, can be packaged for cost-effective shipment.

While the present invention has been described in connection with a preferred embodiment thereof, it will be apparent to those skilled in the art that many changes and modifications may be made without departing from the true spirit and scope of the invention. Accordingly, it is intended by the appended claims to cover all such changes and modifications as come within the true spirit and scope of the invention.

What is claimed is:

1. A method of packaging a mattress assembly constructed of coil springs wherein each spring is contained within an individual pocket of fabric, comprising the steps of:

providing a tube of deformable material, said tube having a predetermined length;

inserting a mattress assembly constructed of pocketed coil springs into said tube, said mattress assembly having a length which is less than the length of said tube, thereby defining first and second tube ends of excess material;

sealing a first end of said tube;

evacuating air from said tube through said second end thereby deforming said tube around said mattress assembly and causing said mattress assembly to compress;

[sealing said second end of said tube after evacuating said tube to a predetermined state;]

inserting said evacuated tube into a containment sleeve which is dimensioned and configured to retain said compressed mattress assembly in a compressed state for shipment;

removing said evacuated tube from said containment sleeve; [and puncturing said evacuated tube to allow] *whereby* said mattress assembly in said tube [to] gradually [return] *returns* to an uncompressed state.

2. The method of claim 1 wherein said first end of said tube is sealed after gathering the excess material of said first end.

3. The method of claim 1 wherein said evacuating step includes gathering said second end of said tube around a vacuum, evacuating means.

4. The method of claim 1 wherein said tube is cut to said predetermined length from a continuous length of tube material.

*5. A method of packaging a mattress assembly constructed of coil springs wherein each spring is contained within an individual pocket of fabric, comprising the steps of:*

*providing a tube of deformable material, said tube having a predetermined length;*

*inserting a mattress assembly constructed of pocketed coil springs into said tube, said mattress assembly having a length which is less than the length of said tube, thereby defining first and second tube ends of excess material;*

*sealing a first end of said tube;*

*evacuating air from said tube through said second end thereby deforming said tube around said mattress assembly and causing said mattress assembly to compress;*

*sealing said second end of said tube after evacuating said tube to a predetermined state;*

*inserting said evacuated tube into a containment sleeve which is dimensioned and configured to retain said compressed mattress assembly in a compressed state for shipment;*

*removing said evacuated tube from said containment sleeve; and*

*allowing said mattress assembly in said tube to gradually return to an uncompressed state.*

*6. A method of packaging a mattress assembly constructed of coil springs wherein each spring is contained within an individual pocket of fabric, comprising the steps of:*

*providing a tube of deformable material, said tube having a predetermined length;*

*inserting a mattress assembly constructed of pocketed coil springs into said tube, said mattress assembly having a length which is less than the length of said tube, thereby defining first and second tube ends of excess material;*

*sealing a first end of said tube;*

*evacuating air from said tube through said second end thereby deforming said tube around said mattress assembly and causing said mattress assembly to compress;*

*sealing said second end of said tube while said tube is being evacuated to a predetermined state;*

*inserting said evacuated tube into a containment sleeve which is dimensioned and configured to retain said compressed mattress assembly in a compressed state for shipment;*

*removing said evacuated tube from said containment sleeve; and*

*allowing said mattress assembly in said tube to gradually return to an uncompressed state.*

*7. A method of packaging a mattress assembly constructed of coil springs wherein each spring is contained within an individual pocket of fabric, comprising the steps of:*

*providing a tube of deformable material, said tube having a predetermined length;*

*inserting a mattress assembly constructed of pocketed coil springs into said tube, said mattress assembly having a length which is less than the length of said tube, thereby defining first and second tube ends of excess material;*

*sealing a first end of said tube;*

*evacuating air from said tube through said second end thereby deforming said tube around said mattress assembly and causing said mattress assembly to compress;*

*inserting said evacuated tube into a containment sleeve which is dimensioned and configured to retain said compressed mattress assembly in a compressed state for shipment;*

*removing said evacuated tube from said containment sleeve; and*

*allowing said mattress assembly in said tube to gradually return to an uncompressed state; and*

*said evacuated tube is punctured to allow said mattress assembly in said tube to gradually return to said uncompressed state.*

*8. A method of packaging a mattress assembly constructed of coil springs wherein each spring is contained within an individual pocket of fabric, comprising the steps of:*

*providing a tube of deformable material, said tube having a predetermined length;*

*inserting a mattress assembly constructed of pocketed coil springs into said tube, said mattress assembly having a length which is less than the length of said tube, thereby defining first and second tube ends of excess material;*

*sealing a first end of said tube;*

*evacuating air from said tube through said second end thereby deforming said tube around said mattress assembly and causing said mattress assembly to compress;*

*inserting said evacuated tube into a containment sleeve which is dimensioned and configured to retain said compressed mattress assembly in a compressed state for shipment;*

*removing said evacuated tube from said containment sleeve;*

*allowing said mattress assembly in said tube to gradually return to an uncompressed state; and*

*said containment sleeve is severed to allow said mattress assembly in said tube to gradually return to said uncompressed state.*

*9. The method of claim 1 wherein said evacuated tube inserted into said containment sleeve is allowed to expand within said containment sleeve.*

* * * * *